United States Patent [19]
Fedeli

[11] Patent Number: 5,910,869
[45] Date of Patent: Jun. 8, 1999

[54] PLANAR MAGNETIC HEAD WITH LONGITUDINAL MULTILAYER MAGNETORESISTANCE

[75] Inventor: Jean-Marc Fedeli, St. Martin D'Meres, France

[73] Assignees: Commissariat a l'Energie Atomique, Paris, France; Silmag, Grenoble, France

[21] Appl. No.: 08/793,894

[22] PCT Filed: Sep. 12, 1995

[86] PCT No.: PCT/FR95/01168

§ 371 Date: Mar. 12, 1997

§ 102(e) Date: Mar. 12, 1997

[87] PCT Pub. No.: WO96/08814

PCT Pub. Date: Mar. 21, 1996

[30]     Foreign Application Priority Data

Sep. 13, 1994 [FR] France .................................. 94 10895

[51] Int. Cl.⁶ .................................................. G11B 5/127
[52] U.S. Cl. .......................................................... 360/113
[58] Field of Search .................................. 360/113, 119, 360/122, 125, 121, 126

[56]             References Cited

U.S. PATENT DOCUMENTS 5,168,408   12/1992   Lazzari ................................... 360/113
5,274,521   12/1993   Miyauchi et al. ....................... 360/113
5,287,238   2/1994   Baumgart et al. ...................... 360/113
5,301,079   4/1994   Cain et al. .............................. 360/113
5,648,884   7/1997   Lazzari .................................... 360/113

FOREIGN PATENT DOCUMENTS 475397   3/1992   European Pat. Off. .
560350   9/1993   European Pat. Off. .
328643   12/1991   Japan .
2047943   12/1980   United Kingdom .

OTHER PUBLICATIONS

IEEE Transactions on Magnetics 25(5), 3689–3691 (1089), Chapman, D.W., et al "A New Horizontal MR Head Structure".
Patent Abstracts of Japan 13(85) Feb. 27, 1989.
Patent Abstracts of Japan 16(117), Mar. 24, 1992.

*Primary Examiner*—Allen T. Cao
*Attorney, Agent, or Firm*—Michael N. Meller

[57]             ABSTRACT

A planar magnetic head including two pole pieces separated by a head gap with a longitudinal multilayer magnetoresistance component MR comprising extending longitudinally beneath the pole pieces and the head gap and separated from the pole pieces by an insulating layer. The MR component is arranged in contact with a pair of spaced apart electrical conductors for connecting said MR component in circuit with a source of electrical power to cause current to flow through said MR component in its lengthwise direction.

5 Claims, 3 Drawing Sheets

PLANAR MAGNETIC HEAD WITH LONGITUDINAL MULTILAYER MAGNETORESISTANCE

TECHNICAL FIELD

The present invention relates to a planar magnetic head having a longitudinal multilayer magnetoresistance. It is used in magnetic recording. The head according to the invention can be read only and constitute a sensor, or can be of the read and write type.

PRIOR ART

The invention essentially applies to so-called horizontal, thin film heads, as is shown in the attached FIG. 1. FIG. 1 shows in section a head having an e.g. silicon semiconductor substrate 10, in which has been etched a recess 12. In said recess has e.g. been electrolytically formed a lower magnetic layer 14, which has been extended by two vertical contact pieces $16_1$, $16_2$. A conductor winding 18 surrounds the contact pieces and is embedded in an insulating layer 20. The magnetic circuit is completed by an upper magnetic layer subdivided into two pole pieces $22_1$, $22_2$ kept apart by an amagnetic spacer 24 forming a head gap.

A magnetoresistant element MR, made from a monolithic material (e.g. Fe—Ni) is placed beneath the amagnetic spacer 24. The head moves in front of a magnetic support 30, where the informations to be read or written are recorded. Such a head is described in FR-A-2 657 189.

The operation of said head is as follows. On writing, the current flowing in the winding 18 creates a magnetic field and consequently an induction in the magnetic circuit. The field lines open out around the spacer 24 and induce a magnetization in the support 30.

On reading, a magnetic information recorded on a track of the support 30 produces a magnetic reading field and consequently an induction in the magnetic circuit. This induction is partly closed again across the magnetoresistant element MR. This leads to a magnetization in said element, which will bring about a resistance variation therein. Not shown means make it possible to measure said resistance variation and thus supply again the information recorded on the support.

Although satisfactory in certain respects, such heads suffer from a disadvantage when the track width to be read is small. For a width of a few micrometers (e.g. 2 $\mu$m), the length of the magnetoresisitance (counted in the transverse direction, i.e. perpendicular to the track) is a few microns (e.g. 3 $\mu$m), which is of the same order of magnitude as the width of the magnetoresistance (2 to 3 $\mu$m). The magnetoresistance has a substantially square shape with very small dimensions. It is then very difficult to obtain a resistance adapted to the detection circuit and which is generally approximately 50 ohms, which would require a much thinner layer in order to be usable.

JP-B-286 413 describes an identical device with only two substantially planar pole pieces separated by a head gap. A magnetoresistant element is placed just beneath the head gap, everything resting on a substrate. This magnetoresistant element operates in the transverse mode, as in the head described in the aforementioned FR-A-2 657 189.

Other magnetic heads are known, such as those described in EP 475 397. In such heads, there are auxiliary head gaps in the magnetic circuit, apart from the main head gap. The magnetoresistant element is not placed just below the main head gap, but instead extends from one auxiliary head gap to the other. This magnetoresistant element is also in contact with the pole pieces.

Therefore, the magnetoresistant element is very remote from the main head gap. Moreover, as said element is in contact with the pole pieces, it forms a true second magnetic circuit.

The present invent ion aims at obviating this disadvantage.

DESCRIPTION OF THE INVENTION

The invention retains the arrangement consisting of placing the magnetoresistant element just below the head gap. However, the invention proposes using on the one hand as the magnetoresistant element a magnetoresistance of a particular type, namely of the multilayer and no longer monolithic type and on the other hand making said magnetoresistance operate in the longitudinal mode and no longer in the transverse mode.

It is known that multilayer magnetoresistant materials are constituted by a stack of magnetic layers separated by non-magnetic, metal layers.

The multilayer metal structures use cobalt, iron, copper, chromium, nickel, iron and nickel alloys, silver, gold, molybdenum, ruthenium and manganese, as described in the article by H. YAMAMOTO and T. SHINJO published in "IEEE Translation Journal on Magnetics in Japan", vol. 7, No. 9, September 1992, under the title "Magnetoresistance of Multilayers", pp 674–684.

Such an element can operate in the longitudinal mode if the measuring current flowing through it and the magnetic field which it detects are colinear and directed in the lengthwise direction of the element.

A multilayer magnetoresistance used in the longitudinal mode is either of the "spin valve" type or of the antiferromagnetic coupling type (i.e. in a zero field, the magnetic layers alternately have an opposing magnetization). The invention more particularly applies to the latter type of magnetoresistance.

The use of a multilayer magnetoresistance according to the invention permits a close coupling between the two upper pole pieces of the head and the magnetoresistance.

As the magnetic flux flowing through the magnetoresistance is in the same direction as the current flowing through it and said direction is also the longitudinal direction of the element, the effect of the demagnetizing fields is reduced and consequently the sensitivity of the head is increased.

More specifically, the present invention relates to a planar magnetic head comprising a substantially planar magnetic layer constituted by two pole pieces separated by a head gap, a magnetoresistant element being placed just beneath the head gap, said head being characterized in that the magnetoresistant element is a substantially planar multilayer magnetoresistance constituted by a stack of magnetic layers separated by non-magnetic, metal layers, said magnetoresistance operating in the longitudinal mode and extending longitudinally beneath the pole pieces and beneath the head gap and being separated from said pole pieces by an insulating layer.

DETAILED DESCRIPTION OF EMBODIMENTS

Figure 1:
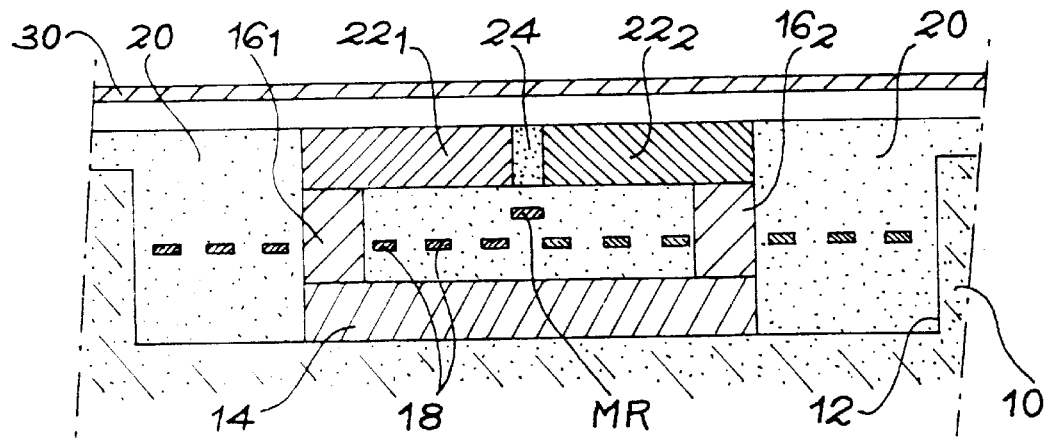
FIG. 1, already described, shows a prior art planar head.
Figure 2:
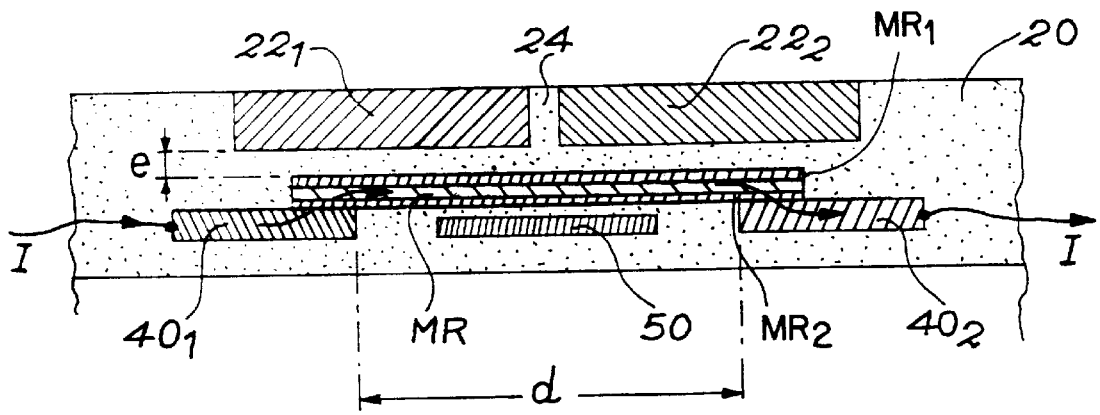
FIG. 2 shows in section an embodiment of a magnetic reading head according to the invention.

FIG. 2 shows in section an embodiment of a magnetic reading head according to the invention. It is possible to see the elements already shown in FIG. 1, namely the two pole pieces $22_1$, $22_2$ separated by the spacer 24 defining the head gap. According to the invention, the magnetoresistant element MR is of the multilayer, longitudinal type as is exemplified in FIG. 2 illustrating two non-magnetic metal layers $MR_1$ and $MR_2$ and is in the form of a substantially flat tape, which is connected to two electric contacts $40_1$, $40_2$. These contacts and a not shown current generator make it possible to bring about a longitudinally directed flow of a current I in the magnetoresistance.

As shown, the head also comprises a transversely positioned polarization conductor 50 (perpendicular to the plane of the drawing).

Figure 3:
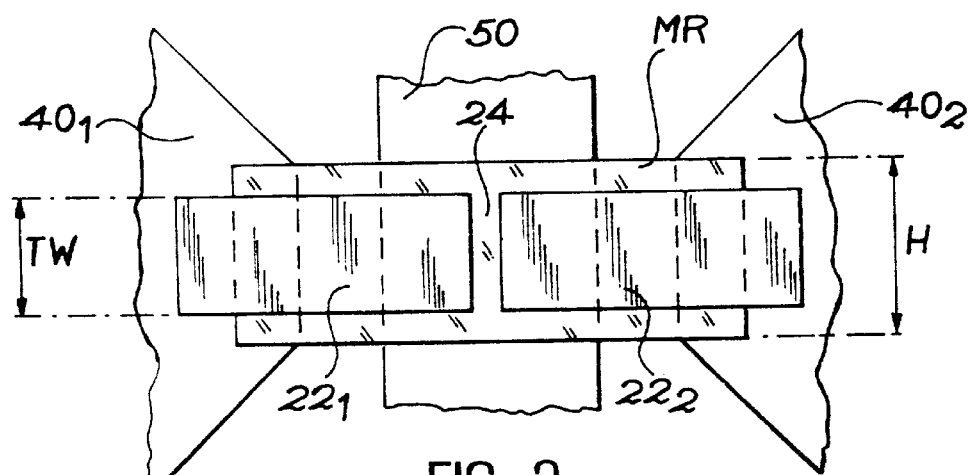
FIG. 3 is a corresponding plan view.

FIG. 3 shows the same elements in plan view. It is possible to see the widened or flared shape of the electric contacts $40_1$, $40_2$ and the transverse direction of the conductor 50.

The distance d between the contacts $40_1$, $40_2$ fixes the electrical length of the magnetoresistance. This length is adjusted so as to obtain a maximum coupling between the pole pieces $22_1$ and $22_2$ and a maximum signal bearing in mind the width of the track. It is generally between 2 and 20 $\mu$m, as a function of the track width and is e.g. approximately 8 $\mu$m for a 5 $\mu$m track.

The width H of the magnetoresistance MR is determined as a function of the distance e separating the magnetoresistance from the pole pieces $22_1$, $22_2$. It is approximately the same as the width TW of the pole pieces and is optionally slightly smaller or larger. The width TW of the pole pieces can be approximately 2 $\mu$m and the width H approximately 3 $\mu$m.

The longitudinal current I flowing through the magnetoresistance creates a magnetic field coiling around the current lines and consequently directed perpendicular to the plane of FIG. 2 level with the two pole pieces $22_1$, $22_2$. This field has the effect of stabilizing the magnetic domains in said pole pieces.

The polarization conductor 50 can be of CrAu, TaAu, TiW or TiWAu. This conductor can optionally have a fine magnetic layer in order to increase its efficiency.

Figure 4:
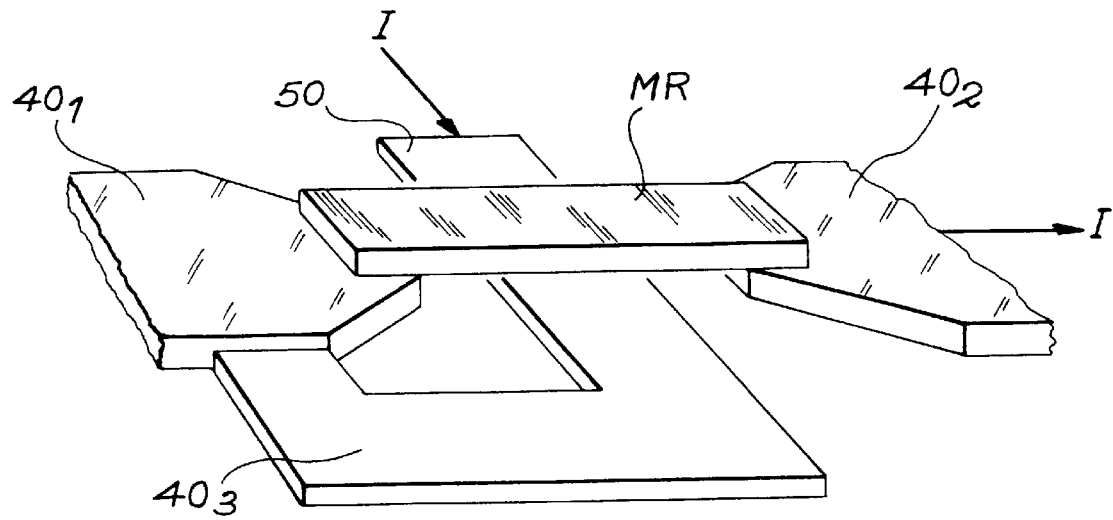
FIG. 4 illustrates an embodiment of the polarization conductor and the magnetoresistance.

FIG. 4 illustrates an embodiment of the magnetoresistance MR and the polarization conductor 50. The two elements are connected in series by means of a connection element $40_3$ connected to the end contact $40_1$. In this way, the current I flowing in the magnetoresistance MR also flows in the conductor 50 used for the polarization of the magnetoresistance.

In this variant, the polarization conductor 50 is advantageously made from the same material as the magnetoresistance and can also be magnetoresistive. Naturally it is a transverse and not longitudinal magnetoresistive effect, as in the main magnetoresistance MR. However, this auxiliary effect, linked with the magnetic flux not passed by the main magnetoresistance MR, but which is in part recovered by the conductor, will improve the overall sensitivity of the head.

The head described hereinbefore is used solely for the reading of magnetic informations. In other words it is a sensor. It is possible to complete said device, so that it is also able to read informations on a support, which will give a read and write head.

Figure 5:
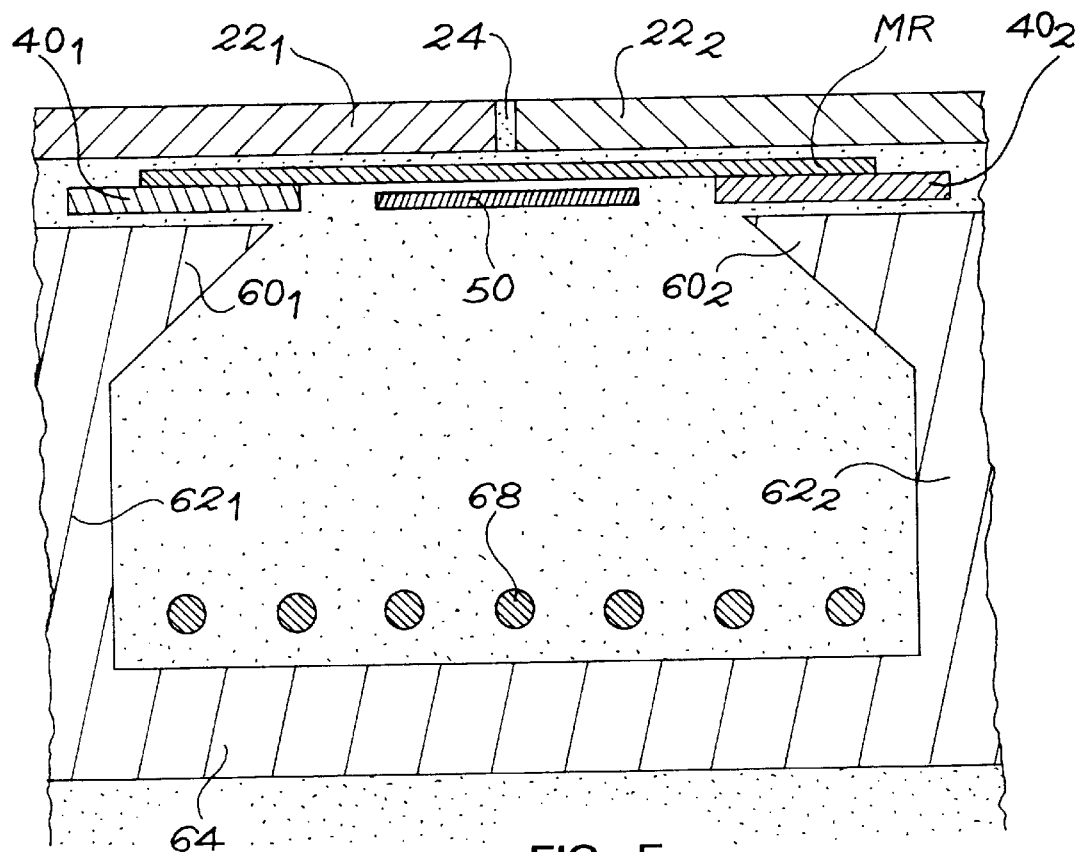
FIG. 5 shows in section a read and write head according to the invention.

Such a head is shown in section in FIG. 5. The elements already shown in FIGS. 2 and 3 carry the same references, namely the two pole pieces $22_1$, $22_2$, the amagnetic head gap 24, the magnetoresistance MR, the contacts $40_1$, $40_2$ and the polarization conductor 50. The head shown also comprises a magnetic flux closing circuit, which in the embodiment shown is constituted by two concentrators $60_1$, $60_2$, two posts $62_1$, $62_2$ and a lower magnetic layer 64.

The device also comprises a conductor winding 68 coupled to the magnetic circuit and generally constituted by a spiral double winding. The writing current flows through said winding.

In this device, the magnetoresistance MR is not in electrical contact with the flux closing circuit, but its ends are located in said circuit. During the writing phase, the ends of the magnetoresistance will be saturated by the writing field, which will not generate writing.

Figure 6A:
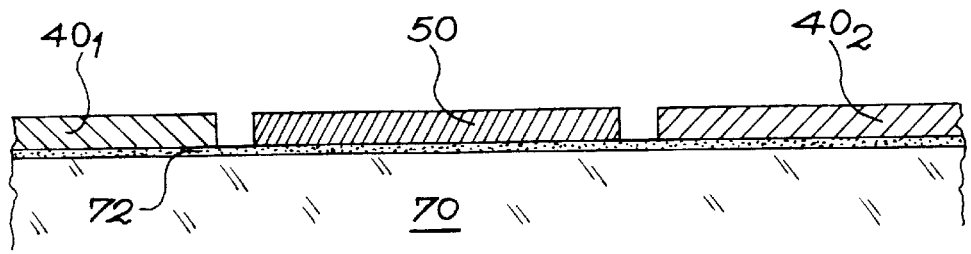
FIGS. 6A, 6B, 6C and 6D illustrate four stages of a process for producing the upper part of a head according to the invention.
Figure 6B:
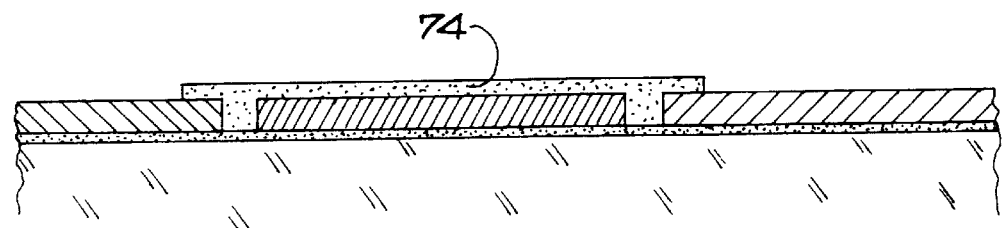

FIGS. 6A to 6D show four stages of a process for producing a read head according to the invention (or the upper part of a read and write head). One starts with a substrate 70 (or a subassembly already incorporating a flux closing circuit with its winding). On said substrate is deposited an insulating layer 72 (FIG. 6A).

This is followed by the deposition of a metal layer etched into three elements, namely a central element 50 which will constitute the future polarization conductor and two end elements $40_1$, $40_2$, which will form the future contact pieces. This is followed by the deposition (FIG. 6B) of an insulating layer 74 etched so that it is only left in the centre.

Figure 6C:
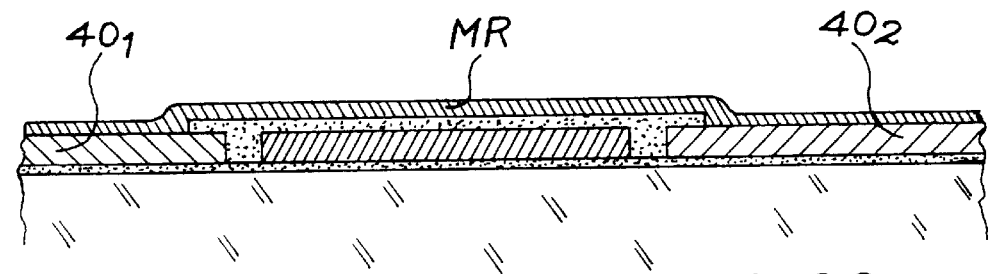
Figure 6D:
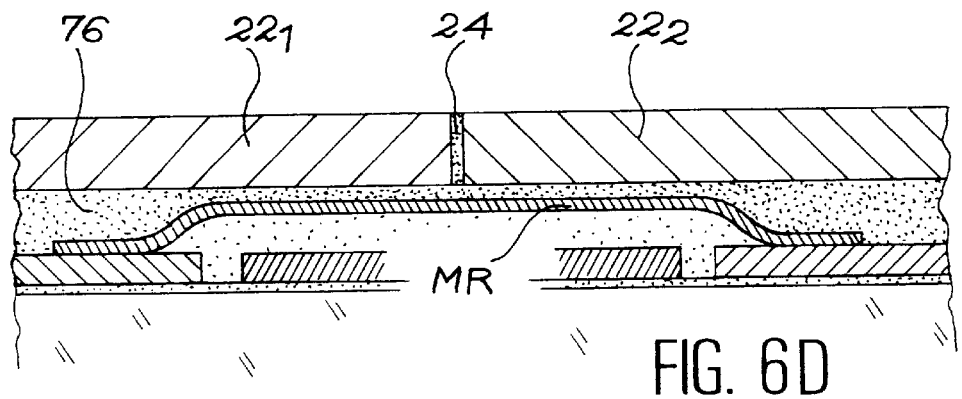

A multilayer magnetoresistive material layer is then deposited (FIG. 6C). This layer is etched so as to give it the desired width and length, so that the magnetoresistant element MR is obtained. Finally deposition takes place of a new insulating layer 76 (FIG. 6D) and the pole pieces $22_1$, $22_2$, separated by the amagnetic head gap 24, are formed by any known means.

I claim:

1. A planar magnetic head comprising a substantially planar magnetic layer formed of two pole pieces arranged in tandem along a longitudinal direction separated by a head gap, a substantially planar multilayer magnetoresistance component consisting of a stack of magnetic layers separated by non-magnetic metal layers, said magnetoresistance component extending in said longitudinal direction between said pole pieces transverse to said head gap and being disposed beneath said pole pieces and said head gap separated by an insulating layer, said magnetoresistance component receiving a magnetic field from said two pole pieces in said longitudinal direction, a pair of electrical conductors spaced apart from one another with each conductor connected to said magnetoresistance component to form an electrical circuit when connected to a source of electrical power such that current is caused to flow through said magnetoresistance component in said longitudinal direction.

2. A magnetic head according to claim 1 further comprising a transversely positioned polarization conductor.

3. A magnetic head according to claim 2, wherein said polarization conductor is connected electrically in series with said the magnetoresistance.

4. A magnetic head according to claim 2, wherein said polarization conductor is of magnetoresistive material.

5. A magnetic head according to claim 4, further comprising a magnetic flux closing circuit and a conductor winding magnetically coupled to said magnetic circuit so that said magnetic head is able to operate both in reading and writing, said magnetoresistance being out of contact with the magnetic flux closing circuit, but having ends located in said magnetic flux closing circuit.

* * * * *